United States Patent
Krishnan et al.

(10) Patent No.: US 7,917,626 B2
(45) Date of Patent: *Mar. 29, 2011

(54) SMART NODES FOR WEB SERVICES

(75) Inventors: Gopal Krishnan, Austin, TX (US); Matthew Sanchez, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 30 days.

This patent is subject to a terminal disclaimer.

(21) Appl. No.: 12/368,928

(22) Filed: Feb. 10, 2009

(65) Prior Publication Data

US 2009/0144364 A1 Jun. 4, 2009

Related U.S. Application Data

(63) Continuation of application No. 11/186,577, filed on Jul. 21, 2005, now Pat. No. 7,490,153.

(60) Provisional application No. 60/590,745, filed on Jul. 23, 2004.

(51) Int. Cl.
*G06F 15/173* (2006.01)
*G06F 15/16* (2006.01)
*G06F 15/177* (2006.01)
*G06F 11/00* (2006.01)

(52) U.S. Cl. ........ 709/226; 709/205; 709/220; 709/219; 714/4; 705/26

(58) Field of Classification Search .................. None
See application file for complete search history.

(56) References Cited

U.S. PATENT DOCUMENTS

| | | | |
|---|---|---|---|
| 6,415,284 B1 | 7/2002 | D'Souza et al. | |
| 7,013,290 B2 | 3/2006 | Ananian | |
| 7,328,243 B2 * | 2/2008 | Yeager et al. | 709/205 |
| 7,543,174 B1 * | 6/2009 | van Rietschote et al. | 714/4 |
| 2002/0091854 A1 * | 7/2002 | Smith | 709/236 |
| 2003/0101265 A1 * | 5/2003 | Dantzig et al. | 709/226 |
| 2003/0172145 A1 * | 9/2003 | Nguyen | 709/223 |
| 2003/0187974 A1 * | 10/2003 | Burbeck et al. | 709/224 |
| 2004/0103195 A1 * | 5/2004 | Chalasani et al. | 709/226 |
| 2004/0128669 A1 * | 7/2004 | Furst et al. | 717/178 |
| 2004/0153545 A1 * | 8/2004 | Pandya et al. | 709/226 |

* cited by examiner

*Primary Examiner* — Wen-Tai Lin
(74) *Attorney, Agent, or Firm* — Stevens & Showalter LLP (57) ABSTRACT

A smart node is integrated with each Web service in a Web service application chain to automatically supply compatible features, missing functionality, and orchestration of the processes in the application, without coordination by an orchestration engine, in an embodiment. A smart node is a software program that systematically specifies the communications dimensions, functionality, and orchestration required for interoperability among Web services. The communications parameters, backup functionality, and process orchestration required for the Web services in a Web service application may be predetermined and programmed into smart nodes. The smart nodes are subsequently integrated with the Web services in a Web service application so that communications among the Web services occur first through the smart nodes. The smart nodes can thus supply communications parameters, any missing functionality, and dynamic process orchestration based on the current event context of the Web service application. A smart node further enables a Web service to supply different functionality in different contexts.

20 Claims, 9 Drawing Sheets

| Provider computer 150 sends claim form to interface logic 600. |
| --- |
| 1 |

| Interface logic 600 sends claim form to smart node 1 302. |
| --- |
| 2 |

| Smart node 1 302 employs EP 1 702 to receive the claim file. |
| --- |
| 3 |

| Smart node 1 302 relays the claim file to smart node 2 304. |
| --- |
| 4 |

| Smart node 2 304 employs EP 4 708 to transform the message format of the claim file. |
| --- |
| 5 |

| Smart node 2 304 sends the claim file to smart node 3 306. |
| --- |
| 6 |

| Smart node 3 306 employs EP 7 714 to validate the claim file. |
| --- |
| 7 |

| Smart node 3 306 sends the claim file to smart node 4 308. |
| --- |
| 8 |

| Smart node 4 308 employs EP 7 720 to send the claim file to the payer at client computer 2 170. |
| --- |
| 9 |

| EP 7 720 sends the claim file to the payer at client computer 2 170. |
| --- |
| 10 |

SMART NODES FOR WEB SERVICES

CROSS-REFERENCE TO RELATED APPLICATIONS

This application is a continuation of U.S. patent application Ser. No. 11/186,577, entitled Smart Nodes For Web Services, filed Jul. 21, 2005, now issued as U.S. Pat. No. 7,490,153, which claims the benefit of U.S. Provisional Application Ser. No. 60/590,745, filed Jul. 23, 2004, the entire disclosures of which are incorporated by reference herein.

FIELD OF THE INVENTION

This innovation relates to services, and, more particularly, to methods that supply the communication parameters and functionality required for invoking services.

BACKGROUND OF THE INVENTION

Services are software services that are annotated with additional information to provide a useful abstraction for a business purpose. A service is a discrete piece of logic with defined set of capabilities for input and output. The following are examples of services:
Java programs,
Portlets, and
Web services.
Web Services The promise of the Internet is an open e-business platform where companies can do business spontaneously with anyone, anywhere, and anytime without requiring that companies abandon their existing software applications and infrastructures. Increasingly companies rely on the Internet to obtain loosely coupled Web services deployed by Web service providers on application-based servers, which are computers on networks that mange the networks.

Web services are business-enterprise computer applications that can be utilized singly or collectively to accomplish a wide range of intended purposes, such as determining health-care patients' eligibility for benefits, submitting health-care claims, and providing stock quotes. Web services help companies dramatically cut costs, increase revenues, and improve competitive agility by combining existing, heterogeneous systems into cross-functional, multi-company applications. For example, Web services designed for insurance companies help them rapidly automate their business processes, eliminating paper and manual touches and saving them tens of millions of dollars annually. To supply such valuable and widely needed services, Web services providers may offer multiple Web services to client businesses.

Because Web services can operate independently of a particular computer language, platform, or location, a client business and a Web service may each use different computer languages, platforms, and locations in widely distributed systems over one or more networks.

Open Web service standards have been developed for compatibility among Web service applications. A standard called SOAP (Simple Object Access Protocol) has been developed to define the format of messages exchanged among applications. The content of messages, such as a request for an action to be performed by a Web service, is currently described in WSDL (Web Services Description Language), which is an XML (Extensible Markup Language) formatted language and which serves as a Web service's interface. Web services are cataloged in a Web based directory and infrastructure called UDDI (Universal Description, Discover and Integration), which is an Internet registry where businesses list themselves according to their services. Communications between a client business and a Web service further rely on the use of a shared transport protocol, such as HTTP (Hypertext Transport Protocol), which enables communications over the Internet.

Typically a client business employs a client application to communicate from its Web site over the Internet according to these standards, to obtain the Web services offered by a Web service provider from its server-based Web site. The Web service provider uses the same standards to reply to a client. Other known or not-yet-known Web service protocols and standards may be used for this communication.

The Web service end point is the physical location of the Web service on a server and implements the Web service interface.

Web Services Applications

Web services applications are computer applications that use Web services singly or collectively to accomplish intended purposes. To work with a specific Web services application, a Web service needs accept business documents, process them, and pass them on in ways compatible with the Web service application.

A Web service application typically consists of one or more Web services, a document that describes how those Web services are to be used, Web portal pages, and UDDI entries.

Figure 1:
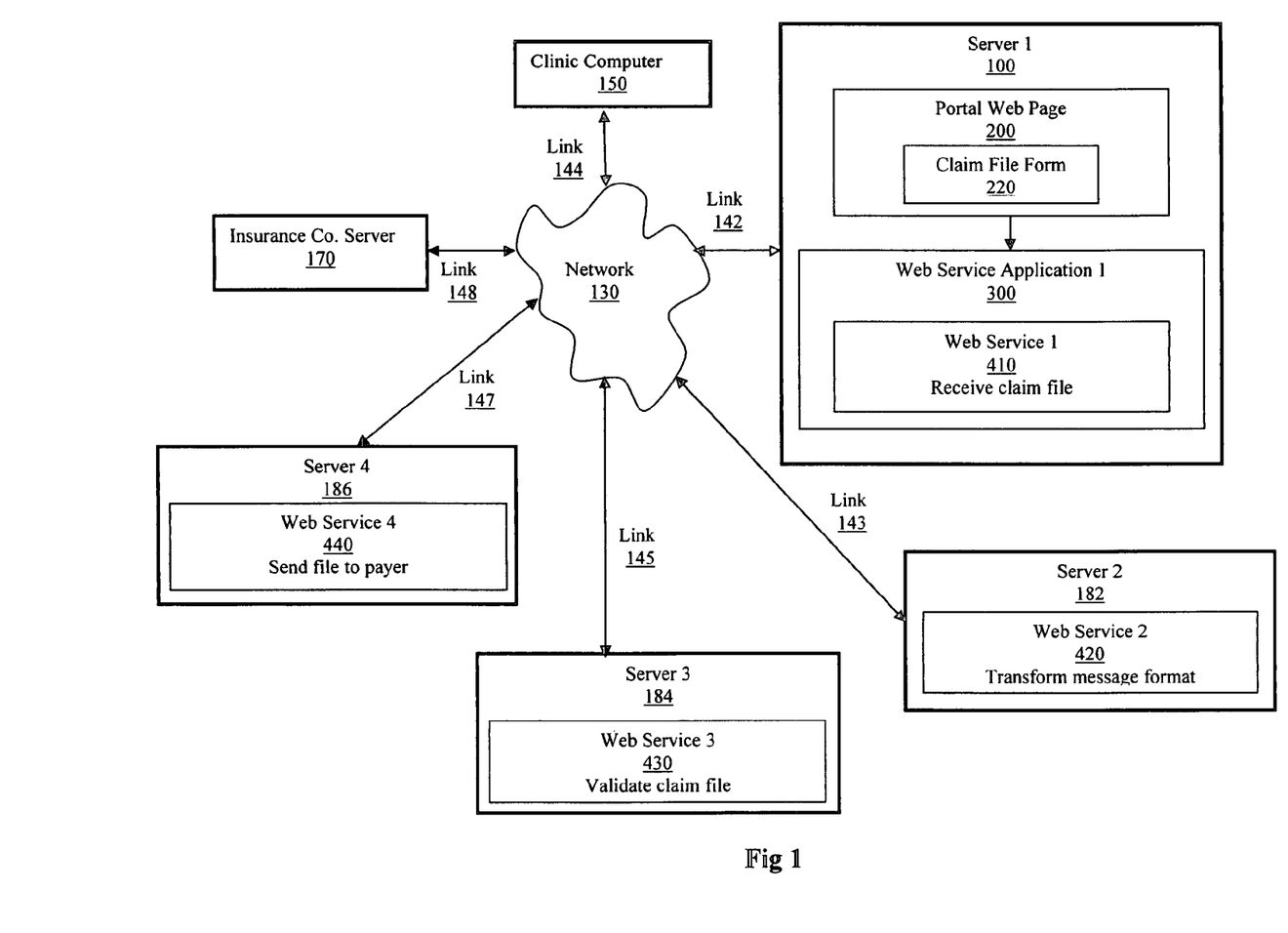
FIG. 1 is a block diagram showing an example of loosely connected Web services chained together through a Web service application for filing patient claims.

FIG. 1 shows an example of how multiple chained Web services are typically used as part of a Web service application for the filing and payment of medical insurance claims. Chained Web services are loosely connected Web services that may reside on different servers and that may be provided by separate businesses. A Web service provider employs a server 100 running a Web portal page 200 and a Web service application 300.

A Web portal page 200 is a Web site interface that a person can reach over the Internet. Web site interfaces are computer-programmed modules that allow end-users to select variables and parameters from easy-to-use visual displays or to type in this input, save the information through selecting a save option, and have their selections automatically applied by computer subsequently, without those users having to program the information manually.

In this example, an attendant at a clinic computer 150 can use the Internet, through a wired link 144, a telephone network 130, and another wired link 142, to reach the portal Web page 200 on the Web service provider server 100. The attendant can then use the portal Web page 200 to fill out a claim file form 220 for one of the clinic's patients and submit it to Web service application 1 300.

Other means for submitting claims also exist. For example, an attendant at a clinic computer 150 might use link 144, network 130, and link 142 for a machine-to-machine transmission of a claim file directly to Web service application 1 300. Many kinds of wired and unwired links and networks could used for this machine-to-machine transmission, such as the Internet, a private LAN (Local Area Network), a wireless network, a TCP/IP (Transmission Control Protocol/Internet Protocol) network, or other communications system.

To continue with the example, Web service application 1 300 receives each claim file through Web service 1 410, which relays the data back over link 142, network 139, and link 143 to server 2 182. If necessary, Web service 2 420 transforms the format of the claim file to a format that Web service application 1 300 can use for its full operations. For example, a claim file might have been sent in NSF (National Standard Format)

format, but Web service application 1 300 might require HIPAA (Health Insurance Portability and Accountability Act) format.

After the claim file is transformed to the correct message format, Web service 2 420 relays the data back over link 142, network 139, and link 145 to Web service 3 430, which is used to validate the claim file. In turn, Web service 3 430 relays the data back over link 142, network 139, and link 147 to Web service 4 440 is used to send the claim file back over link 142, network 130, and link 148 to an insurance company server 170 for payment to the clinic.

For Web service application 1 300 to carry out its operations successfully, the chained Web services 410, 420, 430, and 440 must be compatible and functional. However, when Web services 410, 420, 430, and 440 are on the servers of different Web service providers, they may not have been set up with compatible communication dimensions, which can make interoperability among them impossible. Moreover, if one Web service is dysfunctional, the chain may be broken and the operations blocked.

For example, the following list shows typical examples of communications dimensions that may require compatibility:
  Response time settings
  Error rate settings
  Message formats, such as SOAP flavors or NSF or HIPAA formats
  Security features, such as username and password
  Management features, such as the clients service level and software versions
  Routing information through the chain of Web services Furthermore, if Web service 2 420 is dysfunctional at a particular time, because of a power failure, for example, Web service application 1 410 cannot complete its operations. In such a case, to follow the example in FIG. 1, patients' claims could not be submitted to a payer.

For these reasons, methods are needed that can ensure compatibility among chained Web services and that can substitute functionality from other similar Web servers in the chain when one Web service is down.

Prior Techniques

Typically programmers must manually program substantial portions of the Web services chained in an application to ensure compatibility and functionality in spite of Web service breakdowns.

Figure 1A:
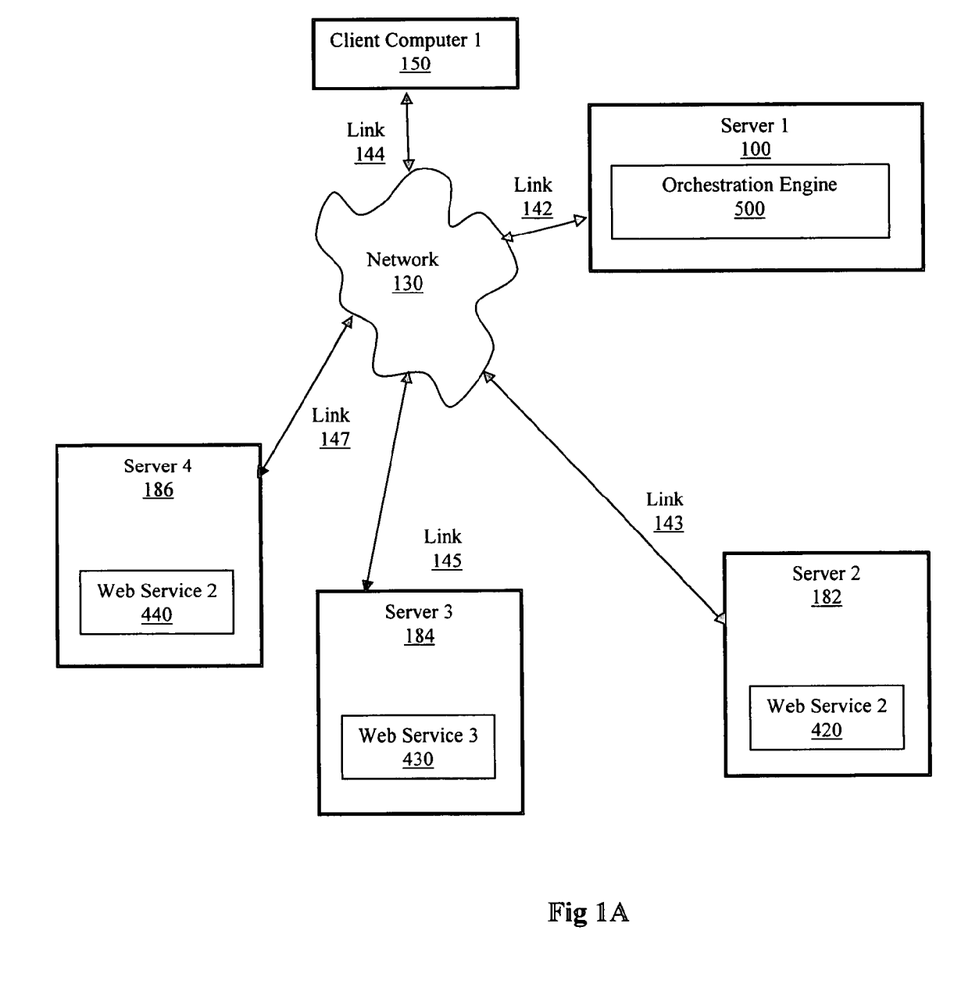
FIG. 1A is a block diagram showing an operating environment where multiple chained Web services on separate servers are used in conjunction for a client computer through an orchestration engine programmed on an additional server.

For example, FIG. 1A shows an operating environment where multiple chained Web services 420, 430, and 440 on separate servers 182, 184, and 186 are used in conjunction for a client computer 150 through an orchestration engine 300 programmed on an additional server 100. The orchestration engine 300 serves as a broker to arrange for the proper use of the different Web services 420, 430, and 440 in appropriate ways and at appropriate times.

However, manual programming is time-consuming and requires special and expensive programming skill, which makes it expensive. Furthermore, a pre-programmed orchestration engine on a separate server is an additional expense and may not provide adequate flexibility for the many conceivable steps required for the successful orchestration of multiple Web services.

Therefore there is a need for a method and apparatus that provides a more automatic method for ensuring compatibility among chained Web services and for replacing the operations of a dysfunctional Web service in the chain.

BRIEF SUMMARY OF THE INVENTION

These and other needs are addressed by the present invention. The following explanation describes the present invention by way of example and not by way of limitation.

It is an aspect of the present invention to provide an automatic method for successfully chaining Web services in a Web service application.

It is another aspect of the present invention to provide an automatic method for ensuring compatibility of features among chained Web services without coordination by an orchestration engine.

It is another aspect of the present invention to provide an automatic method for replacing the functionality of a dysfunctional Web service in a chain with the functionality of another Web service in the chain without coordination by an orchestration engine.

It is another aspect of the present invention to provide an automatic method for placing data in a queue until a dysfunctional Web service in a chain becomes functional again.

It is an aspect of the present invention to provide an automatic method for successfully chaining Web services in a Web service application through dynamic, context-driven orchestration.

These and other aspects, features, and advantages are achieved according to the method and apparatus of the present invention. In accordance with the present invention, in an embodiment, a smart node is integrated with each Web service in a Web service application chain to automatically supply compatible features, missing functionality, and orchestration of the processes in the application, without coordination by an orchestration engine. A smart node is a software program that systematically specifies the communications dimensions, functionality, and orchestration required for interoperability among Web services. The communications parameters, backup functionality, and process orchestration required for the Web services in a Web service application may be predetermined and programmed into smart nodes. The smart nodes are subsequently integrated with the Web services in a Web service application so that communications among the Web services occur first through the smart nodes. The smart nodes can thus supply communications parameters, any missing functionality, and dynamic process orchestration based on the current event context of the Web service application. A smart node further enables a Web service to supply different functionality in different contexts.

BRIEF DESCRIPTION OF THE DRAWINGS

The following embodiment of the present invention is described by way of example only, with reference to the accompanying drawings, in which.

DETAILED DESCRIPTION

The following description explains a method and apparatus to supply a smart node to each Web service in a Web service application chain to automatically supply compatible features and to replace any missing functionality. The details of this explanation are offered to illustrate the present invention clearly. However, it will be apparent to those skilled in the art that the concepts of present invention are not limited to these specific details. Commonly known elements are also shown in block diagrams for clarity, as examples and not as limitations of the present invention.

Operating Environment

Figure 2:
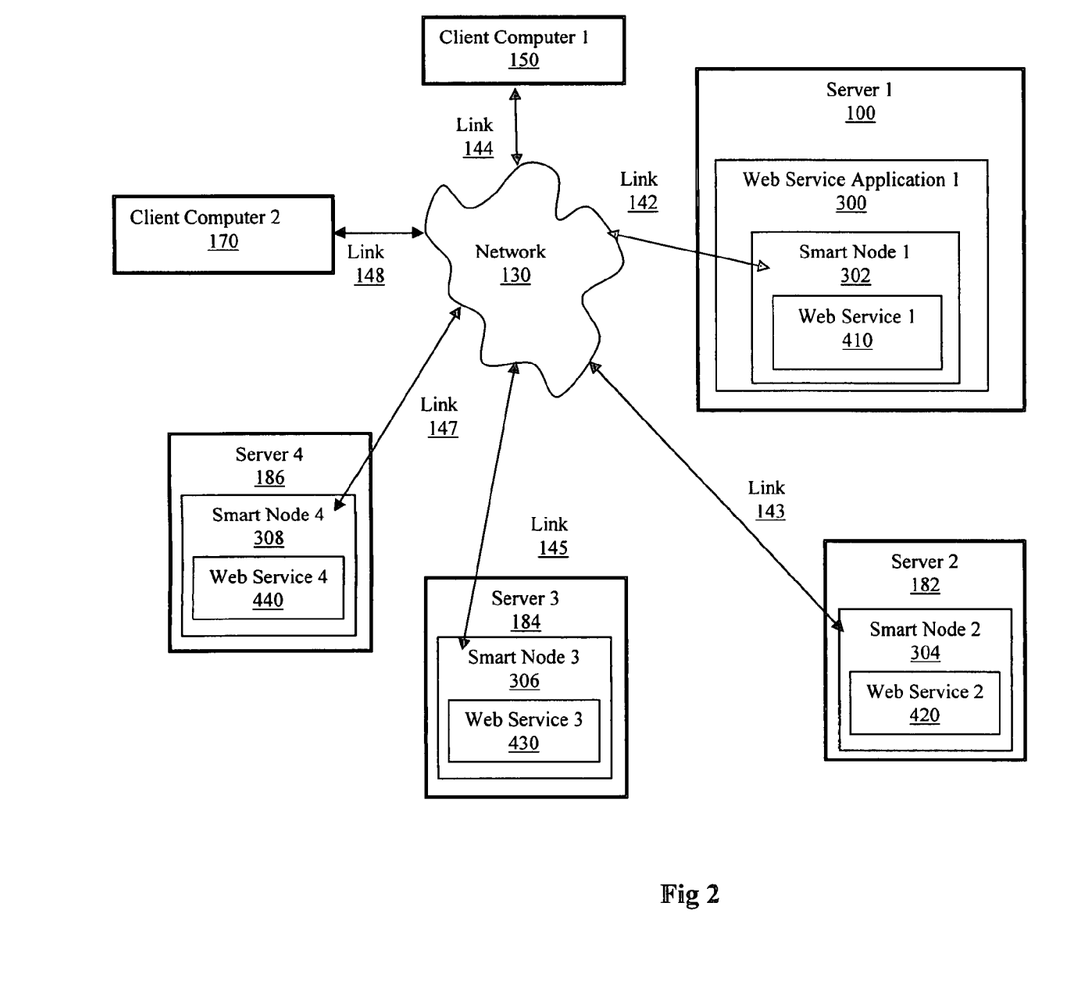
FIG. 2 is a block diagram showing an operating environment in which embodiments of the present invention may be employed.

An embodiment of an operating environment of the present invention is shown in FIG. 2. A party employs a server 100 to run a Web service application 300, which uses multiple chained Web services 410, 420, 430.440 located on multiple servers 100, 182, 184, and 186. The servers 100 may be personal computers or larger computerized systems.

The Web services 410, 420, 430, 440 communicate through a wired or wireless network 130 and wired or wireless links 142, 143, 145, 147, and 148. The network 130 may be the Internet, a private LAN (Local Area Network), a wireless network, a TCP/IP (Transmission Control Protocol/Internet Protocol) network, or other communications system, and may comprise multiple elements such as gateways, routers, and switches. The links 142,143, 145, 147, and 148 are compatible with the technology used for network 130.

Smart Nodes

The programmer or programmers who design Web service application 1 300 create smart nodes 302, 304, 306, and 308 for each Web service 410, 420, 430, 440 in the chain orchestrated by Web service application 1 300. A smart node is a software program that systematically Specifies the communications dimensions and functionality required for interoperability among chained Web services 410, 420, 430, 440;

Provides for replacement of missing functionality; and

Orchestrates the processes of the application dynamically, based on the current event context of the Web service application.

In a sense, a smart node is itself a Web service that defines the formal aspects that other Web services require to be able to work together in a chain. Because of the systematic way that a smart node presents this information, any further required programming is simplified.

Unlike in the orchestration engine system described above, the smart nodes 302, 304, 306, and 308 in the present system are programmed to operate independently and in a distributed fashion to dynamically supply communications dimensions and functionality based on the context of the Web service application that invokes them. Through the present invention, a smart node further enables a Web service to supply different functionality in different contexts. A Web service with such a smart node can be a member of multiple Web service applications, with the smart node supplying the different communications dimensions and functionality required by each Web service application.

For example, in an embodiment a smart node 2 182 could be programmed to encrypt the credit card numbers for the patients referred to by a first Web service application, which requires such security, but not for patients referred to by a second Web service application, which does not share this security requirement. Alternatively, the smart node 2 182 could be programmed to encrypt the credit card number of one specific patient or customer but not that of another specific individual.

In this embodiment, communications among chained Web services 410, 420, 430, 440 take place first through smart nodes 302, 304, 306, and 308 so that each smart node can specify the required communications dimensions to the Web service with which it is integrated, meaning programmed to work with, and can further ensure required functionality.

Alternate Embodiments

In another embodiment, a smart node 302 can be designed for a Web service application 1 300 that employs only one Web service 410. In this case, the smart node 302 specifies the communications dimensions Web service 410 needs to use to be compatible with Web service application 1 300. In yet another embodiment, service application 1 300 could employ a single Web service 430 on another server 184 and smart node 306.

In another embodiment, Web services 410, 420, 430, 440 can all be located on one server 100.

Figure 2A:
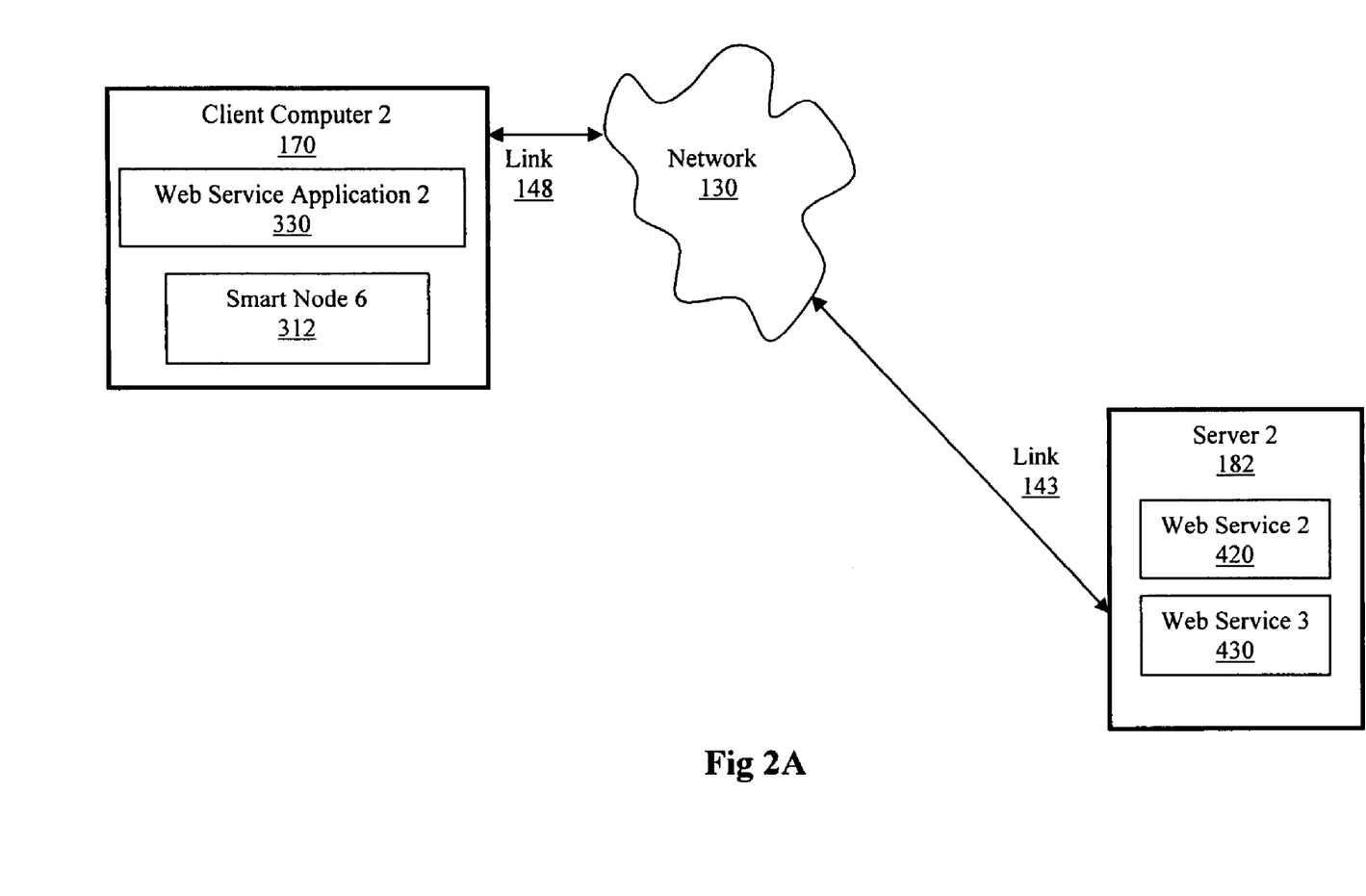
FIG. 2A is a block diagram showing an alternate operating environment in which embodiments of the present invention may be employed.

In still another embodiment, shown in FIG. 2A, a smart node 312 may be located on a client computer 170 along with a Web service application 330 that employs Web services 420 and 430 on a remote server 182. In this scenario, smart node 312 supplies the communications dimensions and missing functionality for Web services 420 and 430.

Examples of Smart Node Communications Dimensions

In an embodiment, smart nodes 302, 304, 306, and 308 might usefully specify parameters for the following communications dimensions for the Web services 410, 420, 430, 440 chained through Web service application 1 300. In different embodiments, smart nodes 302, 304, 306, and 308 might apply these dimensions uniformly to all the Web services 410, 420, 430, 440 in the chain or might supply different dimensions for individual Web services within the chain.

Performance

This category might specify which response-time setting should be used (for example, 10 seconds or 20 seconds). It might also specify the error-rate percentage that should be used (for example, less than 1%).

Interoperability

This might specify what formats the Web services 410, 420, 430, 440 must follow to be compatible with Web service application 1 300. For example, it might specify the message formats to be used, such as particular SOAP flavors or NSF or HIPAA formats.

Security Features

These might indicate the username, password, and type of encryption to be used.

Management Features

These might specify the business service level and software versions to be used.

Routing information

This might specify the pre-processing and post processing of each Web service in the Web service application, in other words the choreography of which Web service is used at each step of the process governed by Web service application 1 300.

Reliability

This might guarantee delivery of a message. For example if Web service 4 440 is down, smart node 3 306 might be programmed to replace the functionality of Web service 4 440. Or smart node 3 306 might place its data in a queue until Web service 4 440 is functional.

Examples of Functionality

The smart nodes 302, 304, 306, and 308 supply the functionality required for all the Web services 410, 420, 430, 440 to operate successfully that are chained through Web service application 300.

For example, in an embodiment smart nodes 302, 304, 306, and 308 arrange for the replacement of the following functionality among any of the web services 410, 420, 430, 440 shown in FIG. 1:

Receive claim file
Transform message format
Validate claim file
Send file to payer Alternately, the smart nodes 302, 304, 306, and 308 shown in FIG. 2 could specify that when a Web service, such as 430, is dysfunctional the data sent to the Web service 430 would be placed in a queue until the Web service 430 becomes functional again.

Process of Supplying Smart Nodes—Overview

Figure 3:
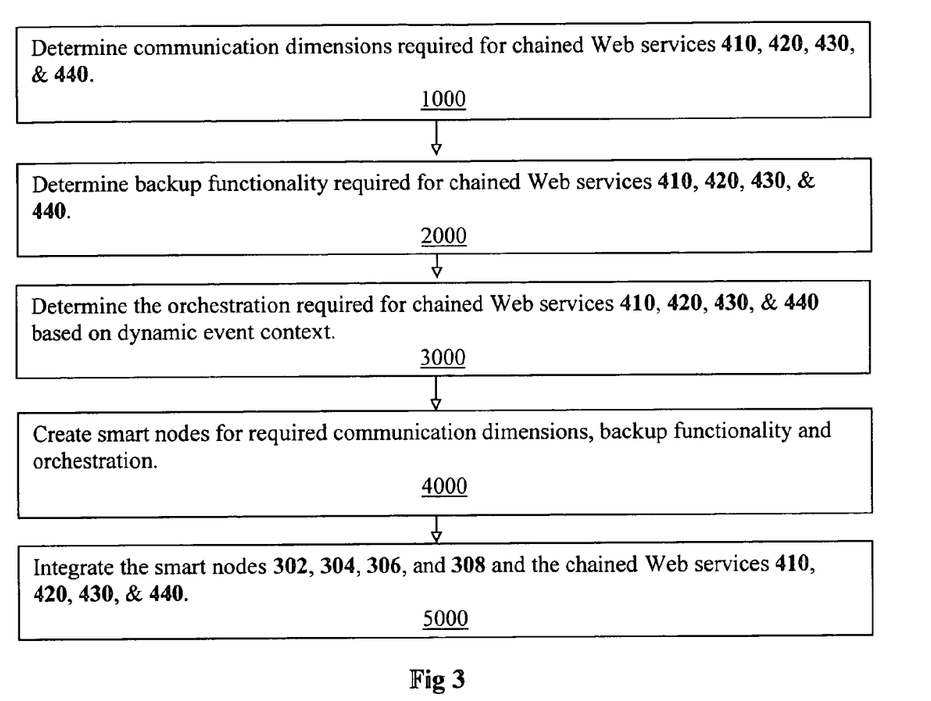
FIG. 3 is a top-level flow chart that illustrates a process for a Web service provider to automatically ensure feature compatibility and replace missing functionality among chained Web services.

FIG. 3 is top-level flow chart that illustrates a process for a Web service provider to automatically supply the smart nodes, through the operating environment shown in FIG. 2. It will be useful to explain the steps in this process briefly from a high level and then to expand elements of this explanation in detail.

Step 1000 in FIG. 3. Determine communication dimensions required for chained Web services 410, 420, 430, & 440.

A programmer or programmers determines the communication dimensions required for the Web services 410, 420, 430, & 440 chained for use with a Web service application 300.

Step 2000 in FIG. 3. Determine backup functionality required for chained Web services 410, 420, 430, & 440, shown in FIG. 2.

A programmer or programmers determines backup functionality required for the Web services 410, 420, 430, & 440, shown in FIG. 2, chained for use with a Web service application 300.

Step 3000 in FIG. 3. Create smart nodes for required communication dimensions and backup functionality.

A programmer or programmers creates the smart nodes 302, 304, 306, and 308, shown in FIG. 2, for the Web services 410, 420, 430, & 440 chained for use with a Web service application 300.

Step 4000 in FIG. 3. Integrate smart nodes 302, 304, 306, and 308 and the chained Web services 410, 420, 430, & 440.

A programmer or programmers integrates the smart nodes 302, 304, 306, and 308, shown in FIG. 2, and the Web services 410, 420, 430, & 440 chained for use with a Web service application 300.

After the smart nodes 302, 304, 306, and 308 and Web services 410, 420, 430, & 440 have been integrated, users can run the chaining Web service application 300 so that the communication dimensions for interoperability are automatically supplied for each Web service 410, 420, 430, & 440 by the smart nodes 302, 304, 306, and 308. Moreover, the specified functional specified in the smart nodes 302, 304, 306, and 308 will also be supplied automatically by one or more of the chained Web services 410, 420, 430, & 440 if one of those services becomes dysfunctional.

Note that, in an embodiment, the process describe above may be applied so that a smart node or set of smart nodes can be programmed to provide communications dimensions and functionality for multiple Web service applications, not just for one Web service application.

Example of Dynamic Orchestration

Figure 4:
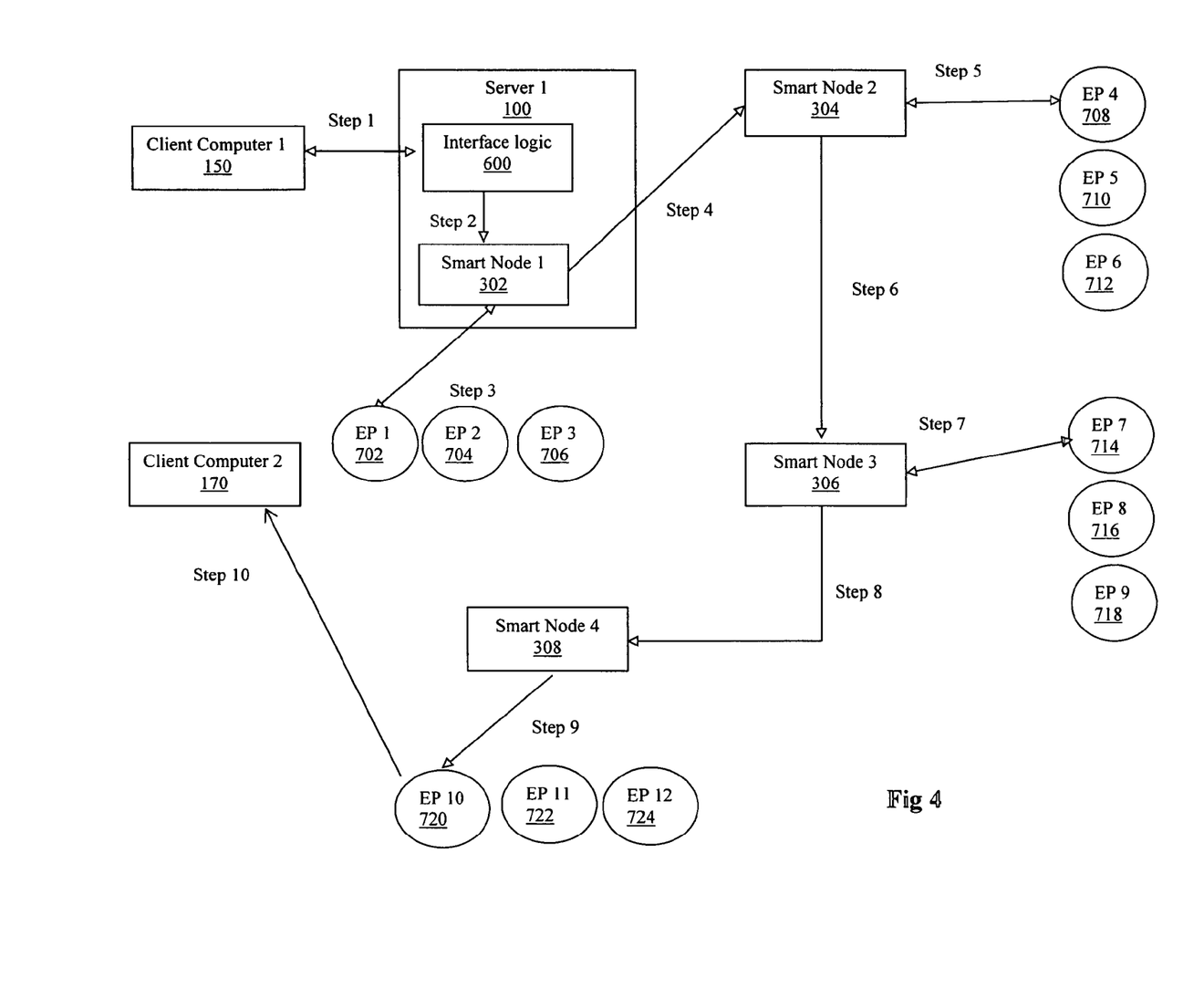
FIG. 4 is a block diagram that illustrates an operating environment where smart nodes chained in an application have been set up in association with multiple Web-service endpoints (EP) for claims filing.
Figure 5:
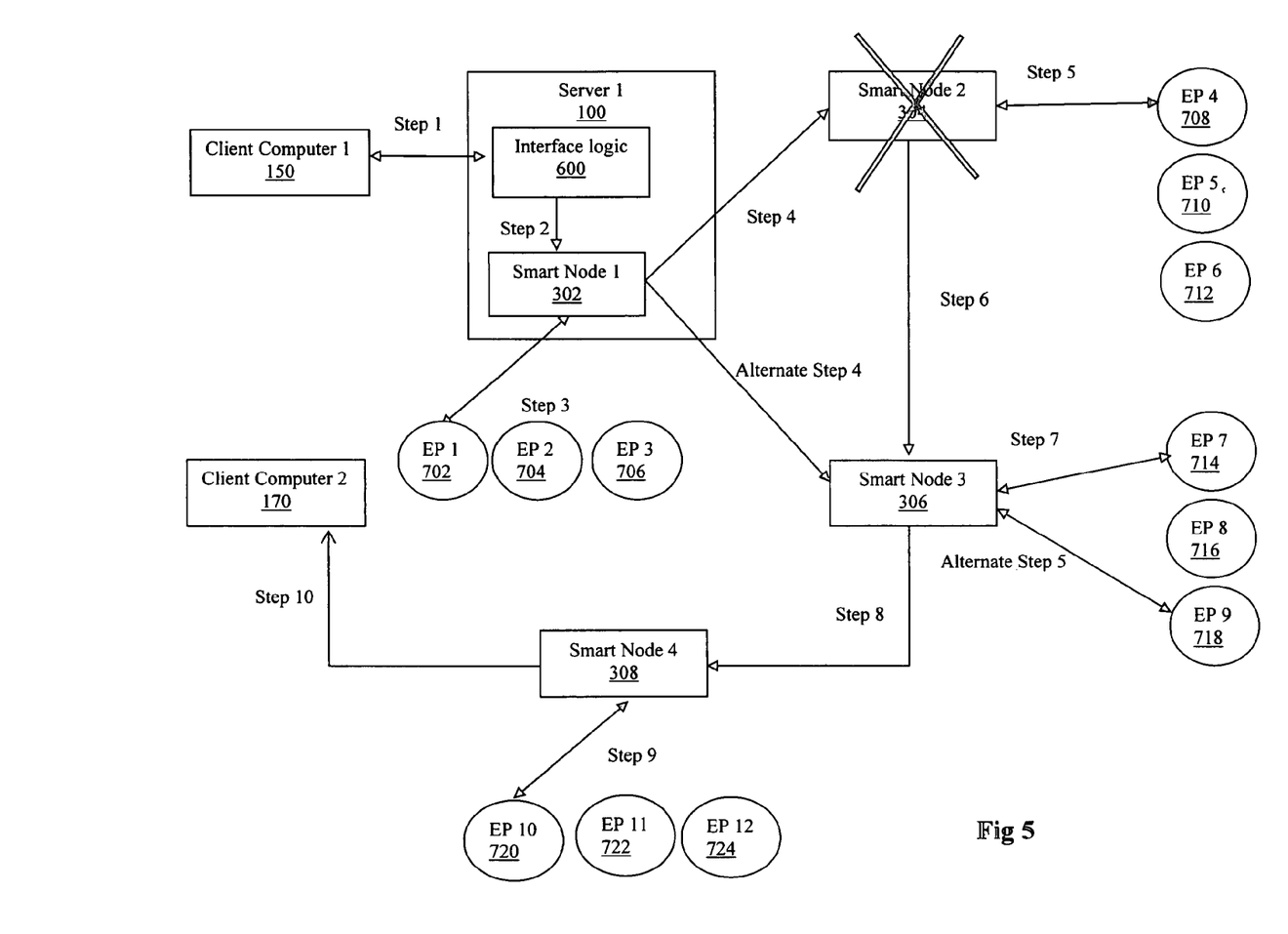
FIG. 5 is a block diagram that illustrates the dynamic orchestration smart nodes can use to accomplish Web service functionality.

FIG. 4 and FIG. 5 illustrate how smart nodes can dynamically orchestrate the processes of a Web service application, based on the event context of that application. FIG. 4 shows an operating environment in an embodiment where smart nodes chained in an application have been set up in association with multiple Web-service endpoints (EP) for claims filing.

Smart node 1 302 is programmed to be associated with EP 1 702, which receives messages, such as patient claims from a clinic at client computer 1 150.

Smart node 2 304 is programmed to be associated with EP 4 708, which transforms message formats.

Smart node 3 306 is programmed to be associated with EP 7 714, which validates claim files.

Smart node 4 308 is programmed to be associated with EP 10 720, which sends files to a payer at client computer 2 170.

Figure 4A:
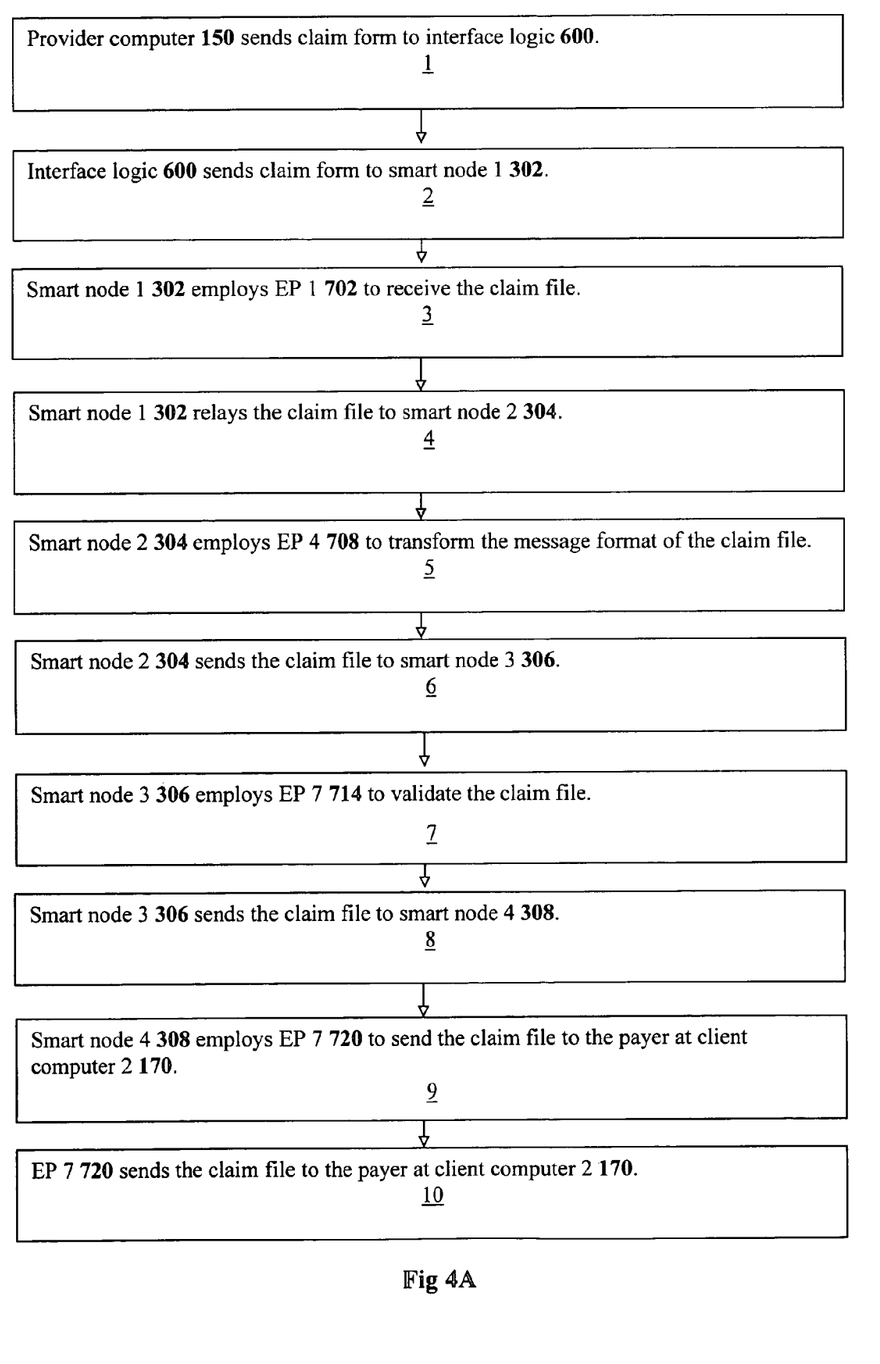
FIG. 4A is a flow chart showing steps involved in claim filing with smart nodes.

In a typical scenario, shown in FIG. 4A, the system carries out the following steps:

Step 1—The provider at client computer 1 150 sends a patient claim to interface logic 600 at server 1 100.

Step 2—The interface logic 600 relays the claim to smart node 1 302.

Step 3—Smart node 1 302 employs EP 1 702 to receive the claim file.

Step 4—Smart node 1 302 relays the claim file to smart node 2 304.

Step 5—Smart node 2 304 employs EP 4 708 to transform the message format of the claim file.

Step 6—Smart node 2 304 sends the claim file to smart node 3 306.

Step 7—Smart node 3 306 employs EP 7 714 to validate the claim file.

Step 8—Smart node 3 306 sends the claim file to smart node 4 308.

Step 9—Smart node 4 308 employs EP 7 720 to send the claim file to the payer at client computer 2 170.

Step 10—EP 7 720 sends the claim file to the payer at client computer 2 170.

Returning to FIG. 4, note that each smart node is also associated with additional Web-service endpoints that may have other functionality, include backup functionality. For example, smart node 3 306 is programmed to be associated with EP 9 718, which transforms message formats. Smart node 3 306 can thus provide backup functionality for smart node 2 304.

FIG. 5 shows the same claim filing scenario listed above, but in a situation where this backup functionality for transforming message formats is very useful because smart node 2 304 has lost power and so is not functional. Because smart node 1 302 has been programmed sufficiently to respond dynamically to the event context, smart node 1 302 recognizes that smart node 2 304 is not functional and takes alternate step 4 to send the claim file to smart node 3 306. Because smart node 3 306 has also been programmed sufficiently to respond dynamically to the event context, smart node 3 306 knows to supply the missing transformation of the message format by employing EP 9 718 in alternate step 5 and then continuing to step 7 as before.

In the same way, all the smart nodes in a given chain may be programmed to provide all the backup functionality required by the application. In addition to the functionality described above, other embodiments can accommodate dynamic orchestration for any other useful aspect of the Web-service application, for example for security.

Computer System Overview

Figure 6:
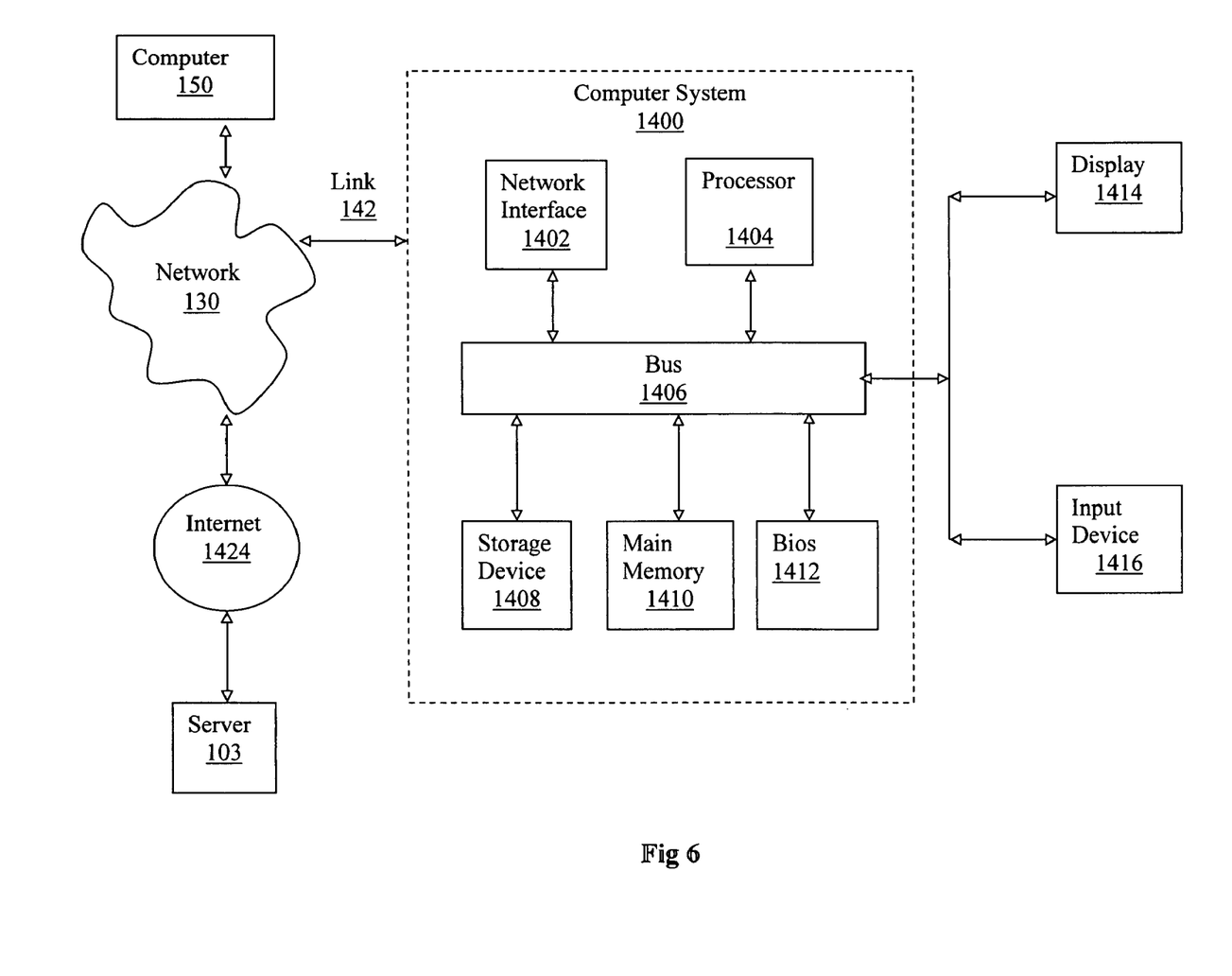
FIG. 6 is a block diagram that illustrates an example of a typical computer system, representing a Web service provider server on which embodiments of the present invention can be implemented.

FIG. 6 is a block diagram that illustrates an example of a typical computer system 1400, well known to those skilled in the art, representing a server 100 on which embodiments of the present invention can be implemented. This computer system 1400 comprises a network interface 1402 that provides two-way communications through a wired or wireless link 142 to a wired or wireless communications network 130 that uses any applicable communications technology. For example, the network 130 can comprise a public telephone network, a wireless network, a local area network (LAN), and any known or not-yet-know applicable communications technologies, using correspondingly applicable links. The network 130 in turn provides communications with one or more host computers 150 and, through the Internet 1424, with one or more servers 103.

The network interface 1402 is attached to a bus 1406 or other means of communicating information. Also attached to the bus 1406 are the following:

a processor 1404 for processing information;

a storage device 1408, such as an optical disc, a magneto-optical disc, or a magnet disc, for storing information and instructions;

main memory 1410, which is a dynamic storage device such as a random access memory (RAM) that stores information and instructions to be carried out by processor 1404;

a bios 1412 or another form of static memory such as read only memory (ROM), for storing static information and instructions to be carried out by processor 1404;

a display 1414, such as a liquid crystal display (LDC) or cathode ray tube (CRT) for displaying information to user of the computer system 1400;

and an input device 1416, with numeric and alphanumeric keys for communicating information and commands to processor 1404. In another embodiment a mouse or other input devices can also be used.

The computer system 1400 is used to implement the methods of the present invention in one embodiment. However, embodiments of the present invention are not limited to specific software and hardware configurations. Computer system 1400 can receive data comprising client application messages from computer 150 and server 103 used by client business, through a network 130 such as the Internet, an appropriate links 142, such as wired or wireless ones, and its network interface 1402. It can of course transmit data back to client business application over the same routes.

Computer system 1400 carries out the methods of the present invention when its processor 1404 processes instructions contained in its main memory 1410. Another computer-readable medium, such as its storage device 1408, may read these instructions into main memory 1410 and may do so after receiving these instructions through network interface 1402. Processor 1404 further processes data according to instructions contained in its storage device 1408. Data is relayed to appropriate elements in computer system 1400 through its bus 1406. Instructions for computer system 1400 can also be given through its input device 1416 and display 1414.

"Computer-readable medium" refers to any medium that provides instructions to processor 1404, comprising volatile and non-volatile media. Volatile media comprise dynamic memory, such as main memory 1410. Non-volatile media comprise magnetic, magneto-optical, and optical discs, such as storage device 1408. Typical examples of widely used computer-readable media are floppy discs, hard discs, magnetic tape, CD-ROMs, punch cards, RAM, EPROMs, FLASH-EPROMs, memory cards, chips, and cartridges. Multiple computer-readable may be used, known and not yet known, can be used, individually and in combinations, in different embodiments of the present invention.

It will also be apparent to those skilled in the art that different embodiments of the present invention may employ a wide range of possible hardware and of software techniques. For example the communication between a Web service provider and client business computers could take place through any number of links, including wired, wireless, infrared, or radio ones, and through other communication networks beside those cited, including any not yet in existence.

Also, the term computer is used here in its broadest sense to include personal computers, laptops, telephones with computer capabilities, personal data assistants (PDAs) and servers, and it should be recognized that it could include multiple servers, with storage and software functions divided among the servers. A wide array of operating systems, compatible e-mail services, Web browsers and other communications systems can be used to transmit messages among client applications and Web services.

Furthermore, in the previous description the order of processes, their numbered sequences, and their labels are presented for clarity of illustration and not as limitations on the present invention.

What is claimed is:

1. A method for dynamically orchestrating the processes of a service application which uses a plurality of chained services, the method comprising the following computer-implemented steps:

determining a plurality of communication dimensions required for interoperability among the plurality of chained services;

determining the backup functionality required for each of the plurality of chained services;

creating a smart node for each of the plurality of chained services, the smart node comprising:

the communications dimensions required for interoperability among the plurality of chained services, and the backup functionality required for interoperability among the plurality of chained services; and executing the service application by dynamically configuring a plurality of smart nodes, such that:

each smart node dynamically selects at least one of the plurality of chained services, and each selected chain service executes at least one process of the service application.

2. The method of claim 1, further comprising:

using at least one smart node to supply backup functionality for at least one service in the service application chain.

3. The method of claim 2, wherein the backup functionality is determined dynamically by:

identifying a first smart node;

selecting, by the first smart node, a desired smart node, such that the desired smart node is associated with a desired service;

determining from the desired smart node that the desired service is not available; and selecting, by the first smart node; an alternate smart node, such that the alternate smart node is associated with an alternate service.

4. The method of claim 1, wherein:

determining a plurality of communication dimensions required for interoperability among the plurality of chained services further comprises:

determining at least one performance dimension.

5. The method of claim 1, wherein:
determining a plurality of communication dimensions required for interoperability among the plurality of chained services further comprises determining at least one interoperability dimension.

6. The method of claim 1, wherein:
determining a plurality of communication dimensions required for interoperability among the plurality of chained services further comprises:
determining at least one security features dimension.

7. The method of claim 1, wherein:
determining a plurality of communication dimensions required for interoperability among the plurality of chained services further comprises:
determining at least one management features dimension.

8. The method of claim 1, wherein:
determining a plurality of communication dimensions required for interoperability among the plurality of chained services further comprises:
determining at least one routing information dimension.

9. The method of claim 1, wherein:
determining a plurality of communication dimensions required for interoperability among the plurality of chained services further comprises determining at least one reliability dimension.

10. A method for dynamically orchestrating the processes of a Web service application which uses a plurality of chained Web services, comprising the following computer-implemented steps:
determining a plurality of communication dimensions required for interoperability among the plurality of chained Web services;
determining the backup functionality required for each of the plurality of chained Web services;
creating a smart node for each of the plurality of Web services, the smart node comprising:
the communications dimensions required for interoperability among the plurality of chained Web services, and
the backup functionality required for interoperability among the plurality of chained Web services; and
executing the service application by dynamically configuring a plurality of smart nodes, such that:
each smart node dynamically selects at least one Web service endpoint, and
each selected Web service endpoint executes at least one process of the service application.

11. The method of claim 10, further comprising using at least one smart node to supply backup functionality for at least one Web service in the Web service application chain.

12. The method of claim 10, wherein:
the backup functionality is determined dynamically by identifying a first smart node;
selecting, by the first smart node, a desired smart node, such that the desired smart node is associated with a desired Web service;
determining from the desired smart node that the desired Web service is not available; and
selecting; by the first smart node; an alternate smart node, such that the alternate smart node is associated with an alternate Web service.

13. The method of claim 10, wherein:
the communications dimensions required for interoperability among the plurality of chained Web services further comprises:
determining at least one performance dimension.

14. The method of claim 10, wherein:
the communications dimensions required for interoperability among the plurality of chained Web services further comprises:
determining at least one interoperability dimension.

15. The method of claim 10, wherein:
the communications dimensions required for interoperability among the plurality of chained Web services further comprises:
determining at least one security features dimension.

16. The method of claim 10, wherein:
the communications dimensions required for interoperability among the plurality of chained Web services further comprises:
determining at least one management features dimension.

17. The method of claim 10, wherein:
determining a plurality of communication dimensions required for interoperability between the Web service and other Web services further comprises:
determining at least one routing information dimension.

18. The method of claim 10, wherein:
the communications dimensions required for interoperability among the plurality of chained Web services further comprises determining at least one reliability dimension.

19. The method of claim 10, further comprising:
identifying a first smart node;
selecting, by the first smart node, a desired smart node, such that the desired smart node is associated with a desired Web service;
determining from the desired smart node at a first time that the desired Web service is not available; and
placing data to the desired Web service in a queue until the desired Web service is available;
determining from the desired smart node at a second time that the desired Web service is available; and
releasing the queued data to the desired Web service.

20. A system comprising:
a computer-implemented Web service application, including a plurality of processes, which uses a plurality of chained Web services;
a plurality of servers, such that the plurality of servers may execute the plurality of chained Web services;
network communication between the plurality of servers;
a dynamic orchestrator configured to:
determine a plurality of communication dimensions required for interoperability among the plurality of chained Web services, and
determine the backup functionality required for each of the plurality of chained Web services;
a respective computer-implemented smart node for each of the plurality of Web services, each computer-implemented smart node comprising:
the communications dimensions required for interoperability among the plurality chained Web services, and
the backup functionality required for interoperability among the plurality of chained Web services; and
wherein a plurality of the computer-implemented smart nodes are configured such that each smart node dynamically selects at least one Web service endpoint, and each selected Web service endpoint executes at least one process of the Web service application.

* * * * *